UNITED STATES PATENT OFFICE.

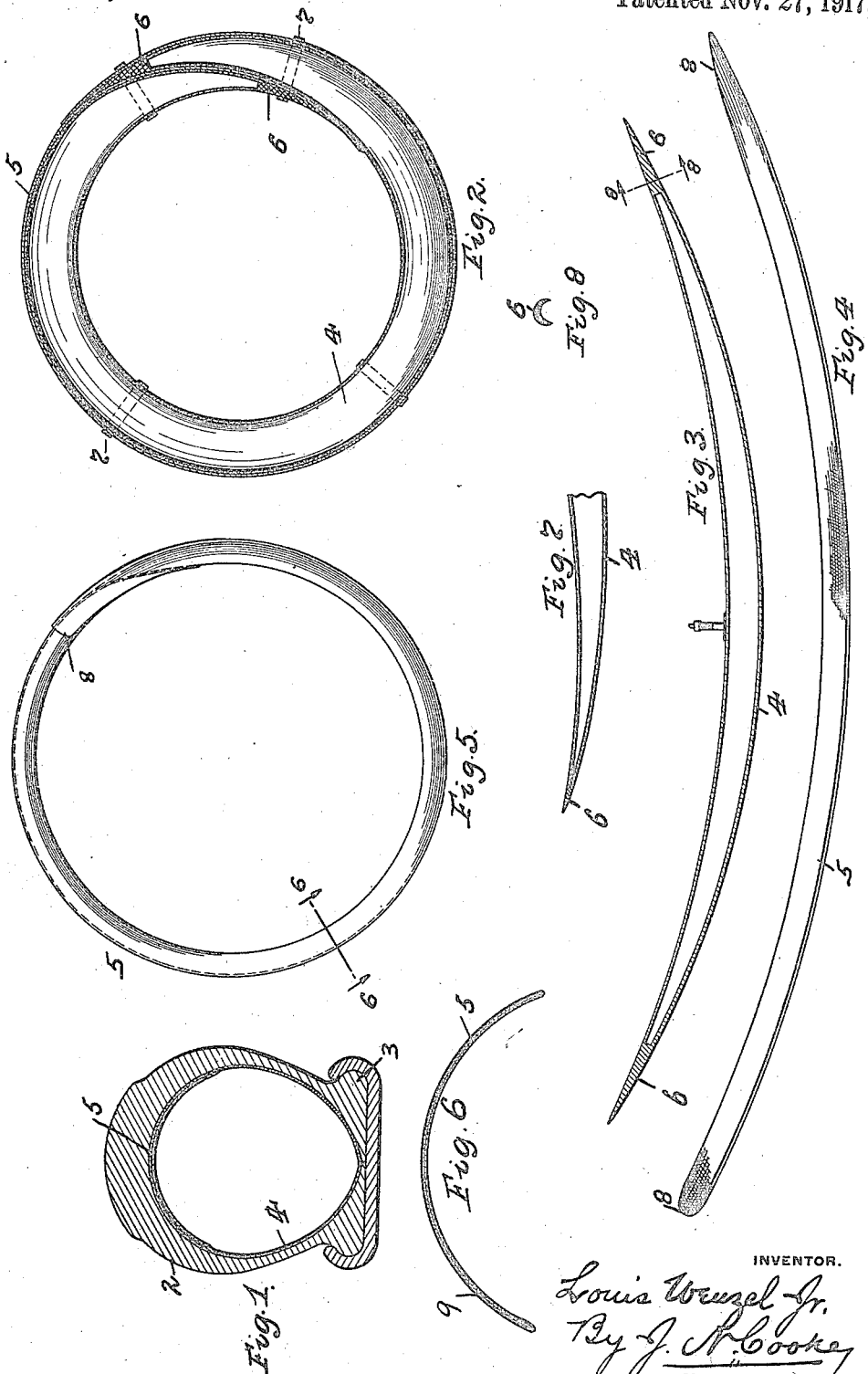

LOUIS WENZEL, JR., OF PITTSBURGH, PENNSYLVANIA.

PNEUMATIC TIRE.

1,248,045.  Specification of Letters Patent.  Patented Nov. 27, 1917.

Application filed April 25, 1917. Serial No. 164,376.

*To all whom it may concern:*

Be it known that I, LOUIS WENZEL, Jr., a citizen of the United States, and a resident of Pittsburgh, (North Side,) in the county of Allegheny and State of Pennsylvania, have invented a new and useful Improvement in Pneumatic Tires; and I do hereby declare the following to be a full, clear, and exact description thereof.

This invention relates to puncture proof pneumatic tires, and relates more particularly to that class of tires known as internally armored pneumatic tires.

Puncture proof tires heretofore produced have generally been heavy impracticable devices requiring the construction of an entirely new tire and oftentimes a new wheel. It is one of the objects of my invention to produce a device that will use an ordinary casing or shoe and only necessitate the use of a new and novel inner tube, and so no change need be made in the appearance or construction of wheels.

Another objection to devices of this class heretofore produced has been that they were so heavy and solid that they decreased the mileage per gallon of gasolene and also the resiliency of the tire.

Another object of my invention is to provide a tire that will increase the mileage per gallon of gasolene due to the increased resiliency and lightness of my tire.

Still another objection to devices of this class heretofore produced has been that they were secured either permanently on the rim or wheel, and the whole wheel had to be taken off and disassembled to make repairs, or the device was secured by special securing means which required special tools to disassemble.

My invention overcomes these objections, for the reason that it uses the ordinary tire shoe or casing secured on the rim of the wheel in the ordinary way.

One preferred form of my invention is described in the following specification and illustrated in the accompanying drawings, in which:—

Figure 1 is a cross section of a tire constructed according to my invention.

Fig. 2 is a side elevation of the inner-tube and its armor assembled, the inner tube being partly broken away to show the solid ends, Fig. 3 is a longitudinal sectional view of a tube in its flattened form.

Fig. 4 is a perspective view of the armor,

Fig. 5 is a side view of the armor showing position in tire,

Fig. 6 cross section on line 6—6 Fig. 5,

Fig. 7 a sectional view showing a modification of the end of inner tube, and

Fig. 8 is a cross section on line 8—8, Fig. 3.

Referring more particularly to the drawings, the numeral 2 designates the casing of an ordinary tire having the usual clencher terminals 3.

My improvement consists in a novel form of inner-tube 4 and resilient protecting and reinforcing spring metallic member 5 and accompanying parts.

The inner tube 4 has overlapping solid ends 6 tapered forwardly, and is held to the resilient member 5 by elastice bands 7.

The member 5 is curved in cross section to form a concave portion to receive the inner tube 4 and has its ends rounded as at 8. The ends of the cushion member and the metallic member overlap in a telescoping fashion and thus the ends of the metallic member are spaced apart by the cushion member. When compressed, the tube will cushion the tire as in ordinary pneumatic tires now in use. A flexible cushioning and covering member 9 surrounds the member 5 to prevent its cutting the inner tube and also prevents slipping of the parts.

It will be understood that numerous changes may be made in size, shape, and other details within the scope of the appended claims.

Having thus described my invention, what I claim is:

1. An armored inner tube for pneumatic tires comprising a two ended air cushion portion, a resilient metallic member semicircular in cross section and of greater length than said inner tube, said metallic member being secured to said air cushion portion by a plurality of flexible bands, and said inner tube being adapted to have its ends overlapped, and a band adapted to secure said ends in their overlapped position.

2. In a tube for pneumatic tires comprising a two ended air cushioned portion, a resilient metallic member semi-circular in cross section and of greater length than said inner tube, said metallic member being secured to said air cushioned member by a plurality of flexible bands, and said inner tube being adapted to have its ends overlapped, said metallic member thereby having its ends spaced apart by said air cushioned portion, and a band adapted to secure said ends in their overlapped position.

In testimony whereof, I, the said Louis Wenzel, Jr., have hereunto set my hand.

LOUIS WENZEL, Jr.

Witnesses:
J. N. COOKE,
JANE M. GEOGHEGAN.

Copies of this patent may be obtained for five cents each, by addressing the "Commissioner of Patents, Washington, D. C."